US012567986B2

(12) United States Patent
Mahajan et al.

(10) Patent No.: US 12,567,986 B2
(45) Date of Patent: Mar. 3, 2026

(54) PERFORMING SECURE DATA INTERACTIONS IN A DISTRIBUTED NETWORK

(71) Applicant: Bank of America Corporation, Charlotte, NC (US)

(72) Inventors: Navdeep Mahajan, Charlotte, NC (US); Darshan Kokkanaghatta Nanjegowda, Charlotte, NC (US); Pavan Chayanam, Alamo, CA (US); Prashanth Kolar, Dublin, CA (US); Srinivas Dundigalla, Waxhaw, NC (US); Arunachalam Packirisamy, Pleasant Hill, CA (US); Indradeep Dantuluri, Harrisburg, NC (US)

(73) Assignee: Bank of America Corporation, Charlotte, NC (US)

( * ) Notice: Subject to any disclaimer, the term of this patent is extended or adjusted under 35 U.S.C. 154(b) by 445 days.

(21) Appl. No.: 17/983,868

(22) Filed: Nov. 9, 2022

(65) Prior Publication Data

US 2024/0154824 A1 May 9, 2024

(51) Int. Cl.
H04L 9/00 (2022.01)
H04L 9/08 (2006.01)

(52) U.S. Cl.
CPC .............. H04L 9/50 (2022.05); H04L 9/0827 (2013.01); H04L 9/083 (2013.01)

(58) Field of Classification Search
CPC .......... H04L 9/50; H04L 9/0827; H04L 9/083
See application file for complete search history.

(56) References Cited

U.S. PATENT DOCUMENTS

| | | | |
|---|---|---|---|
| 8,949,338 B2 | 2/2015 | Ahmed et al. | |
| 9,569,771 B2 | 2/2017 | Lesavich et al. | |
| 9,722,790 B2 | 8/2017 | Ebrahimi | |
| 2007/0211651 A1 | 9/2007 | Ahmed et al. | |
| 2009/0319502 A1 | 12/2009 | Chalouhi et al. | |
| 2010/0268934 A1* | 10/2010 | Hinton .................... | H04L 63/06 713/152 |
| 2015/0046337 A1 | 2/2015 | Hu et al. | |
| 2016/0080325 A1 | 3/2016 | Hochberg et al. | |
| 2016/0277374 A1* | 9/2016 | Reid ................... | H04L 63/0435 |
| 2016/0283920 A1 | 9/2016 | Fisher et al. | |
| 2016/0292672 A1 | 10/2016 | Fay et al. | |
| 2016/0330034 A1 | 11/2016 | Back et al. | |
| 2017/0075941 A1 | 3/2017 | Finlow-Bates | |
| 2017/0085555 A1 | 3/2017 | Bisikalo et al. | |

(Continued)

*Primary Examiner* — Taghi T Arani
*Assistant Examiner* — Blake I Narramore

(57) ABSTRACT

A system includes a plurality of computing nodes that form a blockchain network comprising a first user device of a user and a centralized exchange server that stores a first data file of a first type for the user comprising a private key used to perform data interactions relating to data objects of the user stored in the blockchain network. The central exchange server comprises a processor that receive a first request to switch the first data file from a first type to a second type, exports the private key to the first user device and deletes the private key from the first data file. The processor receives a second request to switch the second data file of the second type to the first data file of the first type, imports the private key to the first data file and deletes the private key from the second data file.

20 Claims, 3 Drawing Sheets

(56)  References Cited

U.S. PATENT DOCUMENTS

| | | | |
|---|---|---|---|
| 2017/0132625 | A1 | 5/2017 | Kennedy |
| 2017/0142076 | A1 | 5/2017 | Tearnen et al. |
| 2017/0185981 | A1 | 6/2017 | Emmerson |
| 2017/0206522 | A1 | 7/2017 | Schiatti et al. |
| 2017/0213209 | A1 | 7/2017 | Dillenberger |
| 2017/0220815 | A1 | 8/2017 | Ansari et al. |
| 2017/0221029 | A1 | 8/2017 | Lund et al. |
| 2017/0228371 | A1 | 8/2017 | Seger, II |
| 2017/0230189 | A1 | 8/2017 | Toll et al. |
| 2017/0244721 | A1 | 8/2017 | Kurian et al. |
| 2017/0279774 | A1 | 9/2017 | Booz et al. |
| 2017/0310747 | A1 | 10/2017 | Cohn et al. |
| 2017/0329980 | A1 | 11/2017 | Hu et al. |
| 2019/0007206 | A1* | 1/2019 | Surla ........................ H04L 63/10 |
| 2019/0097789 | A1* | 3/2019 | Rangayyan ........... G06F 21/602 |
| 2019/0121988 | A1* | 4/2019 | van de Ruit .......... H04L 9/0825 |
| 2021/0092107 | A1* | 3/2021 | Aragon ................. H04W 12/50 |
| 2021/0226812 | A1* | 7/2021 | Park .................... G06F 16/9024 |
| 2021/0250359 | A1* | 8/2021 | Yaacoby ............. H04L 63/0428 |
| 2021/0272109 | A1* | 9/2021 | Adeji ................... G06Q 20/308 |
| 2023/0237200 | A1* | 7/2023 | Chitnis ................... G06F 21/44 |
| | | | 713/193 |
| 2023/0388787 | A1* | 11/2023 | Wilson ................. H04L 9/0825 |

* cited by examiner

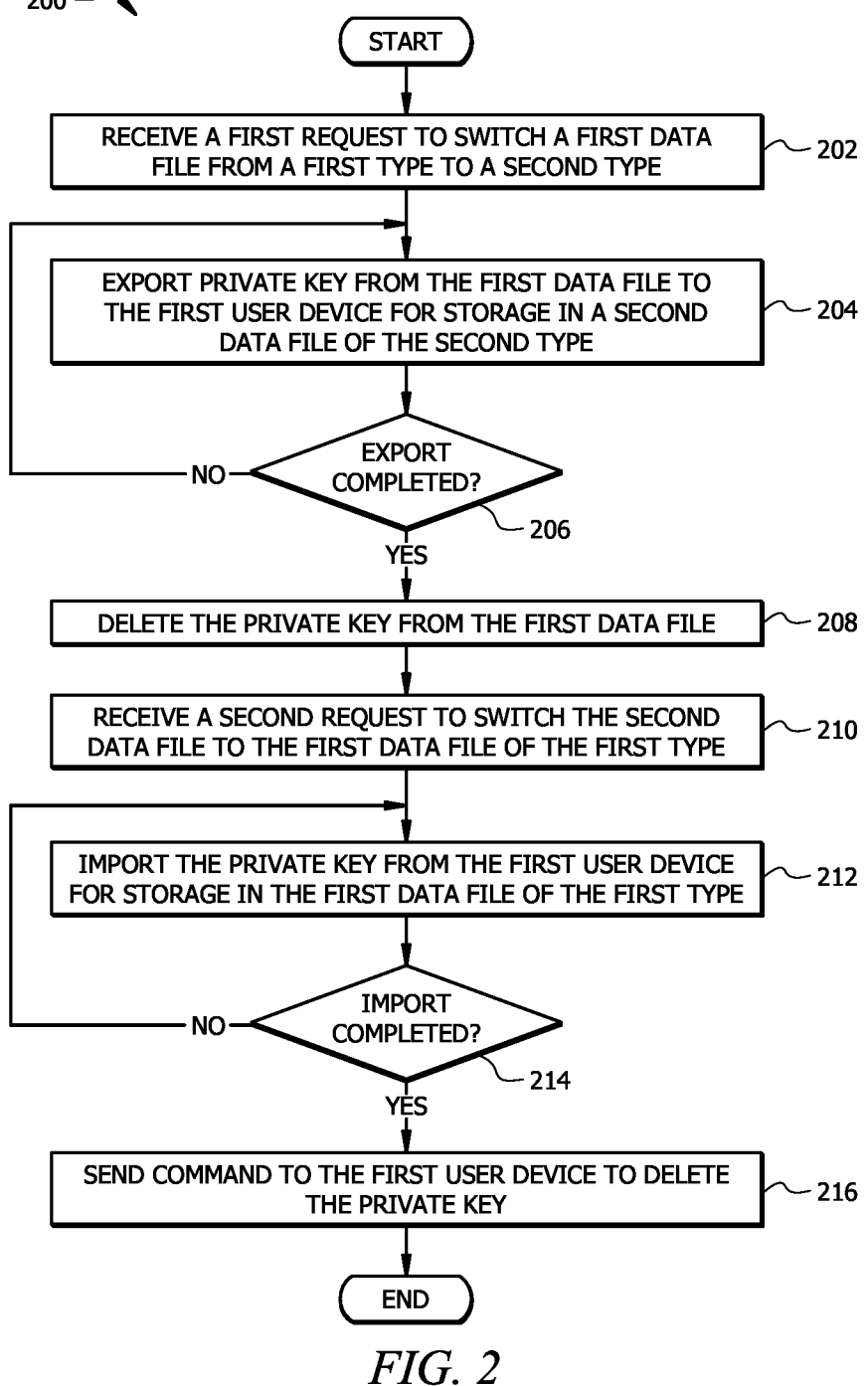

200

START

RECEIVE A FIRST REQUEST TO SWITCH A FIRST DATA FILE FROM A FIRST TYPE TO A SECOND TYPE — 202

EXPORT PRIVATE KEY FROM THE FIRST DATA FILE TO THE FIRST USER DEVICE FOR STORAGE IN A SECOND DATA FILE OF THE SECOND TYPE — 204

EXPORT COMPLETED? — 206

NO

YES

DELETE THE PRIVATE KEY FROM THE FIRST DATA FILE — 208

RECEIVE A SECOND REQUEST TO SWITCH THE SECOND DATA FILE TO THE FIRST DATA FILE OF THE FIRST TYPE — 210

IMPORT THE PRIVATE KEY FROM THE FIRST USER DEVICE FOR STORAGE IN THE FIRST DATA FILE OF THE FIRST TYPE — 212

IMPORT COMPLETED? — 214

NO

YES

SEND COMMAND TO THE FIRST USER DEVICE TO DELETE THE PRIVATE KEY — 216

END

PERFORMING SECURE DATA INTERACTIONS IN A DISTRIBUTED NETWORK

TECHNICAL FIELD

The present disclosure relates generally to data processing, and more specifically to performing secure data interactions in a distributed network.

BACKGROUND

Data interactions in decentralized networks such as a blockchain network are becoming increasingly popular. Data security is important in any system that supports online data interactions between computing nodes of the system. Decentralized networks by their nature are considered more secure as compared to centralized networks since control is distributed among the users of the decentralized network as opposed to being controlled by a central authority. However centralized exchanges are becoming popular in decentralized blockchain networks. These centralized exchanges store the private keys of the blockchain users in their own custodial data files and sign data interactions conducted by a user using the respective private key held for the user at the exchange. The centralized exchanges generally do not allow users access to their own private keys. Owing to their centralized nature, the centralized exchanges are vulnerable to cyber-attacks which negates the core security advantage of decentralized distributed networks.

SUMMARY

The system and method implemented by the system as disclosed in the present disclosure provide technical solutions to the technical problems discussed above by switching between a custodial data file to a non-custodial data file swiftly and securely. The disclosed system and methods provide several practical applications and technical advantages.

For example, the disclosed system and methods provide the practical application of quickly and securely switching between storing a private key of a user in a custodial data file at a central exchange server to storing the private key of the user in a non-custodial data file locally at a user device of the user. As described in embodiments of the present disclosure the user initiates the switch between the custodial data file to the non-custodial data file with a single toggle of a virtual toggle switch provided by an exchange application installed on the user device. In response to receiving a request from the user device to switch from the custodial data file to the non-custodial data file, the central exchange server exports the private key of the user to the user device for storage in the non-custodial data file at the user device. After the switch has been completed the central exchange server deletes the private key of the user from the custodial data file. Once the switch has been completed, central exchange server no more controls the private key of the user. Thus, switching a custodial data file to a non-custodial data file provides the technical advantage of avoiding the user's private key from being stolen as a result of cyber-attacks on the central exchange server, and thus avoiding theft of digital possessions owned by the user from the blockchain network that stores the digital possessions. This generally improves data security in the blockchain network.

The discloses system and methods implemented by the system provide an additional practical application of securely moving the private key of the user between user devices. The central exchange server may securely move the private key of the user from a first non-custodial data file stored at a first user device to a second non-custodial data file stored at a second user device by first performing a switch from the first non-custodial data file at the first user device to the custodial data file stored at the central exchange server, and then switching the custodial data file to the second non-custodial data file at the second user device. This includes importing the private key from the first non-custodial data file to the custodial data file at the central exchange server and then exporting the private key from the custodial data file to the second non-custodial data from at the second user device. By facilitating the transfer of the private key between user devices, central exchange server avoids theft of the private key that may occur when the private key is transferred over a relatively unsecure peer to peer connection between the user devices.

The disclosed system and methods implemented by the system provide an additional practical application of quickly and securely switching between the custodial data file at the central exchange server to multiple non-custodial data files at respective user devices. As described in embodiments of the present disclosure, in response to receiving a single request for the switch from one of the user devices, central exchange server may export the private key of the user to multiple user devices registered for the user for storage in respective non-custodial data files at each of the user devices. Additionally, in response to receiving a single request to switch back to the custodial data file, central exchange server may import the private key from one of the multiple user devices and delete the private key from all the user devices. By performing the switch between the custodial data file and multiple non-custodial data files at multiple user devices simultaneously based on a single request, central exchange server saves networking and processing resources that would otherwise be consumed to perform each switch separately based on a separate request. This saving of networking and processing resources generally improves performance of the computing system and processor that implements the central exchange server.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates a flowchart of an example method for switching between a custodial data file to one or more non-custodial data files, in accordance with one or more embodiments of the present disclosure.

DETAILED DESCRIPTION

Figure 1:
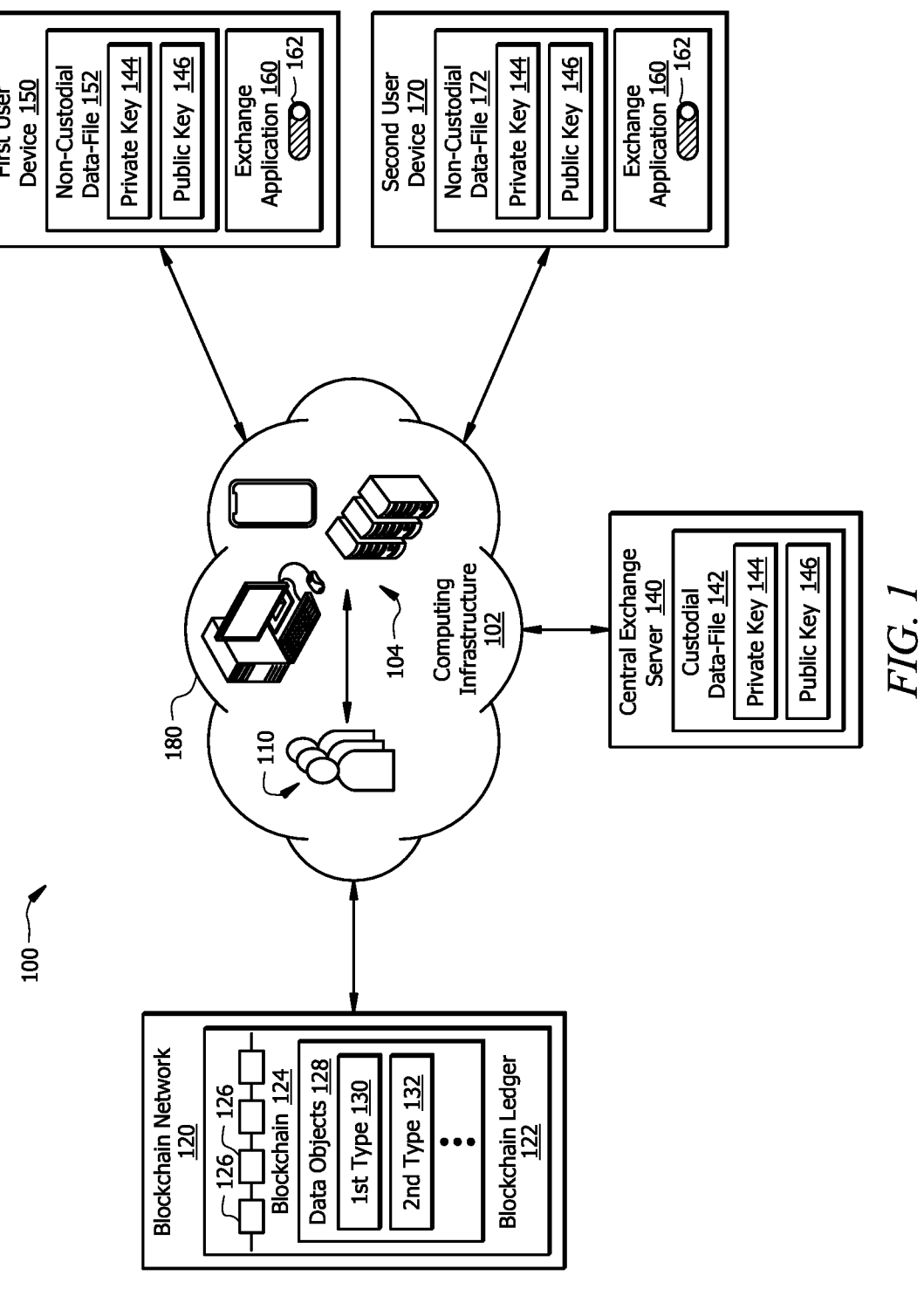
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 including a plurality of computing nodes 104 connected to a network 180. Computing infrastructure 102 may include a plurality of hardware and software components. The hardware components may include, but are not limited to, computing nodes 104 such as desktop computers, smartphones, tablet computers, laptop computers, servers and data centers, virtual reality (VR) headsets, augmented reality (AR) glasses and other hardware devices such as printers, routers, hubs, switches, and memory devices all connected to the network 180. Software components may include software applications that are run by one or more of the computing nodes 104 including, but not limited to, operating systems, user interface applications, third party software, database management software, service management software, metaverse software and other customized software programs implementing particular functionalities. For example, software code relating to one or more software applications may be stored in a memory device and one or more processors may process the software code to implement respective functionalities. In one embodiment, at least a portion of the computing infrastructure 102 may be representative of an Information Technology (IT) infrastructure of an organization.

One or more of the computing nodes 104 may be operated by a user 110. For example, a computing node 104 may provide a user interface using which a user 110 may operate the computing node 104 to perform data interactions within the computing infrastructure 102.

Each computing node 104 of the computing infrastructure 102 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server (e.g., central exchange server 140) running one or more software applications to implement respective functionality as described below. In certain embodiments, one or more of the computing nodes 104 may run a thin client software application where the processing is directed by the thin client but largely performed by a central entity such as a server (not shown).

Network 180, in general, may be a wide area network (WAN), a personal area network (PAN), a cellular network, or any other technology that allows devices to communicate electronically with other devices. In one or more embodiments, network 180 may be the Internet.

The computing nodes 104 or a portion thereof of the computing infrastructure 102 may be part of a blockchain network 120. Blockchain network 120 may implement a blockchain 124 across the computing nodes 104. A blockchain (e.g., blockchain 124) generally is an open, decentralized and distributed digital ledger (e.g., blockchain ledger 122) consisting of records called blocks that are used to record data interactions across many computing nodes (e.g., computing nodes 104). Each computing node 104 of a blockchain network (e.g., blockchain network 120) may maintain a copy of the blockchain ledger (e.g., blockchain ledger 122). Logically, a blockchain is a chain of blocks which contains specific information. As shown in FIG. 1, blockchain 124 includes a chain of blocks 126. Once recorded, the data in any given block 126 cannot be altered retroactively without alteration of all subsequent blocks 126, which requires consensus of the network majority. Each computing node 104 within the blockchain network 120 maintains, approves, and updates new entries. The system is controlled not only by separate individuals, but by everyone within the blockchain network 120. Each member ensures that all records and procedures are in order, which results in data validity and security. Thus, the distributed ledger 122 can record data interactions between two parties (e.g., users 110) efficiently and in a verifiable and permanent way. By design, a blockchain 124 is resistant to modification of the data. For use as a distributed ledger (e.g., blockchain ledger 122), a blockchain 124 is typically managed by a peer-to-peer network collectively adhering to a protocol for inter-node communication and validating new blocks 126. In the context of the present disclosure, each computing node 104 that is part of the blockchain network 120 may store a copy of the blockchain ledger 122 of the blockchain network 120, wherein each copy of the blockchain ledger 122 includes a copy of the blockchain 124.

Each computing node 104 of a blockchain network (e.g., blockchain network 120) is configured to process new blocks (e.g., blocks 126) generated for the blockchain (e.g., blockchain 124) and maintain a most recent copy of the blockchain in the respective ledgers. Any new interaction or activity within the blockchain network may trigger the building of a new block of the blockchain. An interaction may include a computing node 104 of the blockchain network transmitting or receiving data from another computing node 104 of the blockchain network or from a computing node that is not part of the blockchain network. Before a new block is added to the blockchain, it needs to be verified by a majority of the computing nodes in the blockchain network. For example, once a new block 126 is created at a computing node 104 belonging to the blockchain network 120, the new block 126 is sent to each other computing node 104 in the blockchain network 120. Each other computing node 104 verifies the new block 126 and checks whether the information stated in the new block 126 is correct. Once approved by a majority of the computing nodes 104, the new block 126 is added to the blockchain 124. Once a new block 126 is approved for addition to the blockchain 124, each of the computing nodes 104 of the blockchain network 120 may be configured to update a local copy of the blockchain 124 persisted in the respective ledger 122 to reflect the addition of the new block 126.

Each block 126 of the blockchain includes a hash of the block, a hash of the previous block, data that records one or more data interactions or activities associated with the block, and a timestamp of the one or more interactions or activities recorded by the block. The data stored in each block 126 depends on the type of blockchain 124. For example, the data included in a block 126 may include information relating to the data interaction recorded by the block 126 including transmitting/receiving data, details of the data files, a copy of data received or generated as part of the interaction, identities of the sending and receiving nodes involved in the interaction etc. A hash of a block is like a fingerprint that uniquely identifies the block (and the interaction or activity recorded by the block) within the blockchain. Each hash of a block is generated based on a cryptographic hash algorithm. A blockchain network 120 uses public-key cryptography to securely transfer data between computing nodes. Public-key cryptography uses a combination of a public key and private key to secure data in a blockchain network so that only the rightful owner of data can access the data. A public key is like an address on the blockchain to which data may be sent and recorded as belonging to that address. A private key is like a password that gives a user access to digital possessions recorded against a public key.

A user 110 authorized to access the blockchain network 120 and allowed to perform data interactions (e.g., with other users 110) within the blockchain network 120 may own and manage one or more types of data objects 128. One or more data interactions may be performed within the blockchain network 120 in relation to the data objects 128 owned by the user 110. For example, a data interaction may include transferring one or more data objects 128 to a different user 110 of the blockchain network 120. Another data interaction may include receiving one or more data objects 128 from another user 110. Information relating to all data interactions that have ever taken place in the blockchain network 120 is stored in the blockchain 124.

Each user 110 of the blockchain may have a unique pair of a public key and a corresponding private key. The public key is like an address of the user 110 on the blockchain to which data objects 128 may be sent and recorded by the blockchain 124 as belonging to that unique address. The private key is like a password that gives the user 110 access to digital objects 128 recorded against the public key. As further described below, the public and private keys of a user 110 may be stored in a data file (e.g., 142, 152, 170) by one or more devices outside the blockchain 124. In other words, the public and private keys are not stored in the blockchain ledger 122 or anywhere in the blockchain 124. For example, one or more computing devices 104 that are not part of the blockchain network 120 may store the public and private keys of users 110 registered to interact in the blockchain network 120. When a first user 110 wants to receive digital objects 128 from a second user 110 of the blockchain network 120, first user 110 may direct the second user 110 to the unique cryptographic public key of the first user 110. The digital objects 128 transferred to the public key or information thereof are stored in the blockchain 124. The first user 110 may access the digital objects 128 stored in the blockchain 124 using the respective private key of the first user 110. For example, when the first user 110 wants to transfer data objects 128 to the second user 110 within the blockchain 124, the first user 110 may sign an outgoing data interaction using the private key and send out the data objects 128 to a public key of the second user 110.

In one or more embodiments, a data file (e.g., 142, 152, 170) that stores the public and private keys of a user 110 is associated with a software application running on a computing node 104 that stores the data file, wherein the computing node 104 may be owned and/or operated by the user 110 or owned and/or operated by a third-party entity (e.g., central exchange server 140). As described above, information relating to all data interactions that have ever taken place in the blockchain network 120 is stored in the blockchain 124. In one embodiment, a data file may not itself store the data objects 128 but may store information that points to a location of the digital objects 128 within the blockchain 124. For example, data objects 128 include bits of data scattered all over the blockchain 124. The software application associated with the respective data file finds all bits of the data objects 128 associated with the public key/address of the user 110 and sums up the total amount of data objects 128 owned by the user 110. When a first user 110 wants to receive digital objects 128 from a second user 110 or entity of the blockchain network 120, the first user 110 may direct the second user 110 or entity to the unique cryptographic address (e.g., public key) issued by the software application, wherein the second user 110 signs the transfer using a private key of the second user 110. When the first user wants to send data objects 128 to the second user 110, the first user 110 may direct the data objects 128 to a public address (e.g., public key) of the second user 110, wherein the transmission is signed using the private key of the first user 110 stored in the data file (e.g., 142, 152, 170).

Generally, there are two types of data files that store the public and private keys for a user 110 outside the blockchain 124, namely, a custodial data file (e.g., custodial data file 142) and a non-custodial data file (e.g., non-custodial data files 152 and 172). Custodial data files 142 are hosted by a third party that stores the keys (e.g., public and private keys) for several users 110. The third party may be an entity that provides enterprise-level data security systems to preserve and secure data. Central exchange server 140 (shown in FIG. 1) is an example of a third-party entity that stores a private key 144 and a corresponding public key 146 for a user 110 in a custodial data file 142. The centralized exchange server 140 acts as an intermediary between two users 110 in a data interaction involving transfer of data objects 128 between the users 110. The centralized exchange server 140 acts as a custodian of digital possessions (e.g., digital objects 128) owned by a user 110 and holds the private key 144 of the user 110 in a custodial data file 142 of the centralized exchange server 140 rather than allow the user 110 to store the private key 144 in a data file (e.g., non-custodial data file 152 and 172) of the user 110. When the private key 144 of the user is stored in the custodial data file 142, the user 110 generally does not have access to the private key 144 and all data interactions relating to the data objects 128 of the user 110 conducted in the blockchain network 120 are signed by the central exchange server 140 using the private key 144 of the user 110 stored in the custodial data file 142. In one embodiment, the custodial data file 142 is stored locally at the central exchange server 140 and not stored in the blockchain 124.

In certain embodiments, instead of storing the private key 144 of the user 110 in a custodial data file 142 and having the custodian (e.g., central exchange server 140) sign data interactions in the blockchain network 120, user 110 may store the private key 144 and the public key 146 in a non-custodial data file (e.g., 152 and 172). In this case, the user 110 assumes the responsibility of storing and securing the private key 144 and the public key 146. A Non-custodial data file (e.g., 152 and 170) may be web-based or hardware-based. For example, a non-custodial data files 152 and 172 may be stored in a mobile device or a desktop computer of the user 110 connected to the internet. Additionally or alternatively, a data file may be stored in a device (e.g., USB drive) of the user 110 that is not connected to the internet. The user 110 may choose to store the keys (e.g., private key 144 and the public key 146) in one or more devices owned or operated by the user 110. As shown in FIG. 1, the user 110 may store the private key 144 and the public key 146 in non-custodial data file 152 of a first user device 150 of the user 110. Additionally or alternatively, the user 110 may store the private key 144 and the public key 146 in non-custodial data file 172 of a second user device 170 of the user 110. It may be noted that user 110 may choose to store the keys in a single user device (e.g., first user device 150) at a time or in multiple user devices (e.g., first user device 150 as well as second user device 170) simultaneously. In certain embodiments, first user device 150 and/or second user device 170 may be part of the computing nodes 104 connected to network 180. The first user device 150 and the second user device 170 may be part of the blockchain network 120. However, non-custodial data files 152 and 172 may be stored locally on the respective first user device 150 and the second user device 170 and may not be stored on the blockchain 124. When the private key 144 and public key 146 are stored in a non-custodial data file (e.g., 152 and/or 172), the user 110 is responsible to sign data interactions relating to data objects 128 of the user 110 conducted in the blockchain network 120 using the private key 144 locally stored in the user device (e.g., first user device 150 or second user device 170) being used to conduct the data interactions. Storing the private key 144 and the public key 146 in multiple non-custodial data files (e.g., 152 and 172) at respective user devices (e.g., first user device 150 or second user device 170) may allow the user 110 to conduct data interactions relating to data objects 128 using the multiple user devices.

There are several disadvantages of storing the keys (e.g., private key 144) of the user 110 in a custodial data file 142. For example, the centralized exchange server 140 may be a custodian of digital possessions for hundreds or even thousands of users 110 and may store the keys for all those users 110. This may make the centralized exchange server 140 prone to cyber-attacks leading to theft of digital possessions (e.g., data objects). Additionally, if the central exchange server 140 is shut down or out of service for any reason, user 110 loses access to digital possessions (e.g., data objects 128). If the central exchange server 140 is permanently shut down, user 110 may permanently loose access to digital possessions (e.g., data objects 128).

Embodiments of the present disclosure describe techniques to switch between a custodial data file 142 and one or more non-custodial data files (e.g., 152 and 172) for storing the keys (e.g., private key 144 and public key 146) of a user 110. For example, as described in accordance with embodiments of the present disclosure, the disclosed system and methods allow the user 110 to move the keys (e.g., private key 144 and public key 146) of the user 110 quickly and securely between a custodial data file 142 and one or more non-custodial data files (e.g., 152 and 172).

An exchange application 160 associated with the central exchange server 140 may be installed at each of the first user device 150 and the second user device 170. Exchange application 160 is a software application designed to interface and communicate with the central exchange server 140 to implement switching between the custodial data file 142 and one or more non-custodial data files (e.g., 152 and 172). In one example, the first user device 150 is a portable computing device (e.g., smart phone, tablet computer etc.) and the exchange application 160 is a mobile application installed on the portable computing device. In another example, the first user device is a desktop computer or a laptop computer and the exchange application 160 is a software application installed on the respective desktop computer or laptop computer. Certain embodiments of this disclosure describe switching between the custodial data file 142 and one or more non-custodial data files (e.g., 152 and 172) using the first user device 150. However, it may be noted that the described embodiments equally apply to the second user device 170 or any other user device owned and/or operated by the user 110.

User 110 may initiate a switch between the custodial data file 142 and one or more non-custodial data files (e.g., 152 and 172) using the exchange application 160 installed on the first user device 150. A user interface of the exchange application 160 may be configured to provide a mechanism that allows the user 110 to request the switch. For example, the user interface of the exchange application 160 may be configured to provide a virtual toggle switch 162 that is displayed on a display screen of the first user device 150. The toggle switch 162 is switchable between two positions wherein a first position of the toggle switch 162 corresponds to the custodial data file 142 and a second position of the toggle switch 162 corresponds to the non-custodial data file 152. In one embodiment, the second position of the toggle switch 162 corresponds to multiple non-custodial data files stored in respective user devices, for example, the non-custodial data file 152 and the non-custodial data file 172. When the user 110 toggles the toggle switch 162 from a current position to the other position, the exchange application 160 generates a request to switch between the custodial data file 142 and one or more non-custodial data files (e.g., 152 and 172). The toggle switch 162 may be configured to indicate a current storage status of the user's keys (e.g., private key 144 and public key 146). For example, if the keys are stored in the custodial data file 142, exchange application 160 sets the toggle switch 162 to the first position. On the other hand, if the keys are stored in one or more non-custodial data files (e.g., 152 and/or 172), exchange application 160 sets the toggle switch 162 to the second position.

The request generated to switch between custodial and non-custodial data files may depend on the current storage status of the keys. For example, if the keys are stored in the custodial data file 142 and the user 110 moves the toggle switch 162 from the first position to the second position, exchange application 160 generates a request to switch from the custodial data file 142 to one or more non-custodial data files (e.g., 152 and/or 172). On the other hand, if the keys are stored in one or more non-custodial data files (e.g., 152 and/or 172) and the user 110 moves the toggle switch 162 from the second position to the first position, exchange application 160 generates a request to switch from the one or more non-custodial data files to the custodial data file 142. It may be noted that the first position and the second position of the toggle switch 162 are interchangeable. Exchange application 160 may be configured to send the generated request to the central exchange server 140.

In certain embodiments, in response to receiving a request from the first user device 150 to switch from custodial data file 142 to the non-custodial data file 152, central exchange server 140 may be configured to export (e.g., transmit) the private key 144 and the public key 146 to the first user device 150. The exchange application 160 at the first user device 150 may be configured to locally store the received private key 144 and the public key 146 in the non-custodial data file 152. After exporting the private key 144 and the public key 146 to the first user device 150, central exchange server 140 may be configured to delete the private key 144 and the public key 146 from the custodial data file 142. For example, exchange application 160 may be configured to send an indication to the central exchange server 140 that the private key 144 and public key 146 were successfully received and stored in the non-custodial data file 152. In response to receiving the indication, central exchange server 140 may delete the private key 144 and public key 146 from the custodial data file 142. This completes the requested switch from the custodial data file 142 to the non-custodial data file 152. Once the switch has been completed, central exchange server 140 no longer controls the private key 144 of the user 110, and thus, can no longer sign data interactions relating to the data objects 128 conducted in the blockchain network 120. The user 110 is responsible for the security of the private key 144 stored at the first user device 150 and sign data interactions relating to the data objects 128 conducted in the blockchain network 120.

In additional or alternative embodiments, in response to receiving a request from the first user device 150 to switch from the non-custodial data file 152 to the custodial data file 142, central exchange server 140 may be configured to import (e.g., receive or download) the private key 144 and the public key 146 from the first user device 150. For example, central exchange server 140 may request the exchange application 160 at the first user device 150 to transmit the private key 144 and the public key 146 to the central exchange server 140. The central exchange server 140 may be configured to store the received private key 144 and the public key 146 in the custodial data file 142. After importing the private key 144 and the public key 146 from the first user device 150, central exchange server 140 may be configured to send a command to the exchange application 160 at the first user device 150 to delete the private key 144 and the public key 146 from the non-custodial data file 152. In response to receiving the command from the central exchange server 140, exchange application 160 may be configured to delete the private key 144 and the public key 146 from the non-custodial data file 152 at the first user device 150. This completes the requested switch from the non-custodial data file 152 to the custodial data file 142. Once the switch has been completed, central exchange server 140 controls the private key 144 of the user 110, and thus, can sign data interactions relating to the data objects 128 conducted in the blockchain network 120. The user 110 no more has access to the private key 144 and thus cannot sign data interactions relating to the data objects 128 conducted in the blockchain network 120.

Embodiments of the present disclosure provide techniques to securely move the keys (e.g., private key 144 and/or public key 146) of the user 110 between user devices. For example, as further described below, central exchange server 140 may facilitate a secure transfer of the keys (e.g., private key 144 and/or public key 146) of the user 110 between non-custodial data file 152 at the first user device 150 and the non-custodial data file 172 at the second user device 170. A transfer of the private key 144 and/or public key 146 from the first user device 150 to the second user device 170 will now be described. However, it may be noted that this description applies to transfer of the keys from any user device to any other user device including, for example, a transfer of the keys from the second user device 170 to the first user device 150.

When user 110 desires to transfer the private key 144 and/or public key 146 from the first user device 150 to the second user device 170, user 110 may initiate the transfer using the first user device 150 by toggling the toggle switch 162 provided by the exchange application 160 at the first user device 150 to switch the non-custodial data file 152 to the custodial data file 142. Once the toggle switch 162 has been toggled, the switch from the non-custodial data file 152 to the custodial data file 142 is completed as described above which includes deleting the keys from the non-custodial data file 152. Once the requested switch to custodial data file 142 has been completed, user 110 may use the second user device 170 to initiate a switch from the custodial data file 142 to the non-custodial data file 172 at the second user device 170. For example, user 110 may toggle the toggle switch 162 provided by the exchange application 160 at the second user device 170 to initiate the switch. The switch from the custodial data file 142 to the non-custodial data file 172 is completed similar to the switch from the custodial data file 142 to non-custodial data file 152 as described above. Once the switch is completed the private key 144 and the public key 146 are stored in the non-custodial data file

172 at the second user device 170. This completes the transfer of the private key 144 and the public key 146 from the first user device 150 to the second user device 170.

Certain embodiments of the present disclosure provide techniques to switch between the custodial data file 142 and multiple non-custodial data files (e.g., 152 and 172. In one embodiment, exchange application 160 (e.g., at the first user device 150 and/or the second user device 170) may allow the user 110 to configure the central exchange server 140 to switch between the custodial data file 142 and the non-custodial data files 152 and 172. For example, central exchange server 140 may allow user 110 to register the first user device 150 and the second user device 170 at the central exchange server 140 for the switch. The registering may include the user 110 specifying the identities of the first user device 150 and the second user device 170 and further specifying that any requested switches are to be carried out between the custodial data file 142 and both the non-custodial data files 152 and 172. Once configured, user 110 may use either the first user device 150 or the second user device 170 to initiate a switch between the custodial data file 142 and the non-custodial data files 152 and 172. For example, when the user 110 toggles the toggle switch 162 at the first user device 150 or second user device 170 from the custodial position to the non-custodial position, central exchange server 140 exports copies of the private key 144 and public key 146 to the first user device 150 as well as the second user device 170. Each of the first user device 150 and the second user device 170 may store their respective copies of the keys received from the central exchange server 140 in the respective non-custodial data files 152 and 172. Once the switch is completed, the toggle switches 162 at both the first user device 150 and the second user device 170 are set to the non-custodial position.

On the other hand, when the user 110 toggles the toggle switch 162 at the first user device 150 or the second user device 170 from the non-custodial position to the custodial position, central exchange server 140 may import a copy of the private key 144 and the public key 146 from either one of the first user device 150 and the second user device 170 and store the imported copy of the keys in the custodial data file 142. After storing the keys in the custodial data file 142, central exchange server 140 may command both the first user device 150 and the second user device 170 to delete their respective copies of the keys from the non-custodial data files 152 and 172. Once the switch is completed, the toggle switches 162 at both the first user device 150 and the second user device 170 are set to the custodial position.

In certain embodiments, user 110 may own multiple types of data objects 128 stored in the blockchain network 120. For example, as shown in FIG. 1, user 110 may own a first type of data objects 130 and a second type of data objects 132. Each of the first and second types of data objects may be associated with a respective private key 144 and a public key 146. For example, the first type of data objects 130 may be associated with a first private key and a first public key, and the second type of data objects 132 may be associated with a second private key and a second public key. In this context, the custodial data file 142 and the non-custodial data files 152 and 172 may be configured to store private keys and public keys associated with both the first and second types of data objects. The central exchange server 140 may be configured to selectively switch the keys associated with the first type of data objects or the keys associated with the second type of data objects between the custodial data file 142 and one or both of the non-custodial data files 152 and 172. For example, exchange application 160 at the first user device 150 may provide separate toggle switches 162 for each pair of private and public keys associated with the respective type of data objects. User 110 may use a respective toggle switch 162 to request a switch between the custodial data file 142 and the one or more non-custodial data files 152 and 172 for the associated type of data objects.

It may be noted that while the present disclosure describes using a toggle switch to request a switch between the custodial data file 142 and the one or more non-custodial data files 152 and 172, a skilled person may appreciate that other known mechanisms may be used to request the switch including voice commands, text commands, buttons etc.

FIG. 2 illustrates a flowchart of an example method 200 for switching between a custodial data file to one or more non-custodial data files, in accordance with one or more embodiments of the present disclosure. Method 200 may be performed by the central exchange server 140 shown in FIG. 1.

At operation 202, central exchange server 140 receives a first request from a first user device 150 to switch a first data file of a first type (e.g., custodial data file 142) to a second type (e.g., non-custodial data file 152 and/or 172). The first type refers to a custodial data file and the second type refers to a non-custodial data file.

As described above, there may be two types of data files that store the public and private keys for a user 110 outside the blockchain 124, namely, a custodial data file (e.g., custodial data file 142) and a non-custodial data file (e.g., non-custodial data files 152 and 172). Custodial data files 142 are hosted by a third party that stores the keys (e.g., public and private keys) for several users 110. The third party may be an entity that provides enterprise-level data security systems to preserve and secure data. Central exchange server 140 (shown in FIG. 1) is an example of a third-party entity that stores a private key 144 and a corresponding public key 146 for a user 110 in a custodial data file 142. The centralized exchange server 140 acts as an intermediary between two users 110 in a data interaction involving transfer of data objects 128 between the users 110. The centralized exchange server 140 acts as a custodian of digital possessions (e.g., digital objects 128) owned by a user 110 and holds the private key 144 of the user 110 in a custodial data file 142 of the centralized exchange server 140 rather than allow the user 110 to store the private key 144 in a data file (e.g., non-custodial data file 152 and 172) of the user 110. When the private key 144 of the user is stored in the custodial data file 142, the user 110 generally does not have access to the private key 144 and all data interactions relating to the data objects 128 of the user 110 conducted in the blockchain network 120 are signed by the central exchange server 140 using the private key 144 of the user 110 stored in the custodial data file 142. In one embodiment, the custodial data file 142 is stored locally at the central exchange server 140 and not stored in the blockchain 124.

In certain embodiments, instead of storing the private key 144 of the user 110 in a custodial data file 142 and having the custodian (e.g., central exchange server 140) sign data interactions in the blockchain network 120, user 110 may store the private key 144 and the public key 146 in a non-custodial data file (e.g., 152 and 172). In this case, the user 110 assumes the responsibility of storing and securing the private key 144 and the public key 146. A Non-custodial data file (e.g., 152 and 170) may be web-based or hardware-based. For example, a non-custodial data files 152 and 172 may be stored in a mobile device or a desktop computer of the user 110 connected to the internet. Additionally or alternatively, a data file may be stored in a device (e.g., USB drive) of the user 110 that is not connected to the internet. The user 110 may choose to store the keys (e.g., private key 144 and the public key 146) in one or more devices owned or operated by the user 110. As shown in FIG. 1, the user 110 may store the private key 144 and the public key 146 in non-custodial data file 152 of a first user device 150 of the user 110. Additionally or alternatively, the user 110 may store the private key 144 and the public key 146 in non-custodial data file 172 of a second user device 170 of the user 110. When the private key 144 and public key 146 are stored in a non-custodial data file (e.g., 152 and/or 172), the user 110 is responsible to sign data interactions relating to data objects 128 of the user 110 conducted in the blockchain network 120 using the private key 144 locally stored in the user device (e.g., first user device 150 or second user device 170) being used to conduct the data interactions. Storing the private key 144 and the public key 146 in multiple non-custodial data files (e.g., 152 and 172) at respective user devices (e.g., first user device 150 or second user device 170) may allow the user 110 to conduct data interactions relating to data objects 128 using the multiple user devices.

User 110 may initiate a switch between the custodial data file 142 and one or more non-custodial data files (e.g., 152 and 172) using the exchange application 160 installed on the first user device 150. A user interface of the exchange application 160 may be configured to provide a mechanism that allows the user 110 to request the switch. For example, the user interface of the exchange application 160 may be configured to provide a virtual toggle switch 162 that is displayed on a display screen of the first user device 150. The toggle switch 162 is switchable between two positions wherein a first position of the toggle switch 162 corresponds to the custodial data file 142 and a second position of the toggle switch 162 corresponds to the non-custodial data file 152. In one embodiment, the second position of the toggle switch 162 corresponds to multiple non-custodial data files stored in respective user devices, for example, the non-custodial data file 152 and the non-custodial data file 172. When the user 110 toggles the toggle switch 162 from a current position to the other position, the exchange application 160 generates a request to switch between the custodial data file 142 and one or more non-custodial data files (e.g., 152 and 172). The toggle switch 162 may be configured to indicate a current storage status of the user's keys (e.g., private key 144 and public key 146). For example, if the keys are stored in the custodial data file 142, exchange application 160 sets the toggle switch 162 to the first position. On the other hand, if the keys are stored in one or more non-custodial data files (e.g., 152 and/or 172), exchange application 160 sets the toggle switch 162 to the second position.

The request generated to switch between custodial and non-custodial data files may depend on the current storage status of the keys. For example, if the keys are stored in the custodial data file 142 and the user 110 moves the toggle switch 162 from the first position to the second position, exchange application 160 generates a request to switch from the custodial data file 142 to one or more non-custodial data files (e.g., 152 and/or 172). On the other hand, if the keys are stored in one or more non-custodial data files (e.g., 152 and/or 172) and the user 110 moves the toggle switch 162 from the second position to the first position, exchange application 160 generates a request to switch from the one or more non-custodial data files to the custodial data file 142. It may be noted that the first position and the second position of the toggle switch 162 are interchangeable. Exchange application 160 may be configured to send the generated request to the central exchange server 140.

At operation 204, in response to receiving the first request, central exchange server 140 exports the private key 144 to the first user device 150 for storage in a second data file of the second type (e.g., non-custodial data file 152).

As described above, in response to receiving a request from the first user device 150 to switch from custodial data file 142 to the non-custodial data file 152, central exchange server 140 may be configured to export (e.g., transmit) the private key 144 and the public key 146 to the first user device 150. The exchange application 160 at the first user device 150 may be configured to locally store the received private key 144 and the public key 146 in the non-custodial data file 152.

At operation 206, central exchange server 140 checks whether the export has been completed. If the export has not been completed, method 200 continues to export the private key 144 to the first user device 150 at operation 204. However, if the export has been completed, method 200 proceeds to operation 208, where central exchange server 140 deletes the private key 144 from the first data file (e.g., custodial data file 142).

As described above, after exporting the private key 144 and the public key 146 to the first user device 150, central exchange server 140 may be configured to delete the private key 144 and the public key 146 from the custodial data file 142. For example, exchange application 160 may be configured to send an indication to the central exchange server 140 that the private key 144 and public key 146 were successfully received and stored in the non-custodial data file 152. In response to receiving the indication, central exchange server 140 may delete the private key 144 and public key 146 from the custodial data file 142. This completes the requested switch from the custodial data file 142 to the non-custodial data file 152. Once the switch has been completed, central exchange server 140 no longer controls the private key 144 of the user 110, and thus, can no longer sign data interactions relating to the data objects 128 conducted in the blockchain network 120. The user 110 is responsible for the security of the private key 144 stored at the first user device 150 and sign data interactions relating to the data objects 128 conducted in the blockchain network 120.

At operation 210, central exchange server 140 receives a second request from the first user device 150 to switch the second data file (e.g., non-custodial data file 152) back to the first type (e.g., custodial data file).

At operation 212, in response to receiving the second request, central exchange server 140 imports the private key 144 from the first user device 150 for storage in the first data file (e.g., custodial data file 142).

As described above, in response to receiving a request from the first user device 150 to switch from the non-custodial data file 152 to the custodial data file 142, central exchange server 140 may be configured to import (e.g., receive or download) the private key 144 and the public key 146 from the first user device 150. For example, central exchange server 140 may request the exchange application 160 at the first user device 150 to transmit the private key 144 and the public key 146 to the central exchange server 140. The central exchange server 140 may be configured to store the received private key 144 and the public key 146 in the custodial data file 142.

At operation 214, central exchange server 140 checks whether the import has been completed. If the import has not been completed, method 200 continues to import the private key 144 from the first user device 150. However, if the import has been completed, method 200 proceeds to operation 216, where central exchange server 140 sends a command to the first user device 150 to delete the private key 144 from the second data file (e.g., non-custodial data file 152).

As described above, after importing the private key 144 and the public key 146 from the first user device 150, central exchange server 140 may be configured to send a command to the exchange application 160 at the first user device 150 to delete the private key 144 and the public key 146 from the non-custodial data file 152. In response to receiving the command from the central exchange server 140, exchange application 160 may be configured to delete the private key 144 and the public key 146 from the non-custodial data file 152 at the first user device 150. This completes the requested switch from the non-custodial data file 152 to the custodial data file 142. Once the switch has been completed, central exchange server 140 controls the private key 144 of the user 110, and thus, can sign data interactions relating to the data objects 128 conducted in the blockchain network 120. The user 110 no more has access to the private key 144 and thus cannot sign data interactions relating to the data objects 128 conducted in the blockchain network 120.

Figure 3:
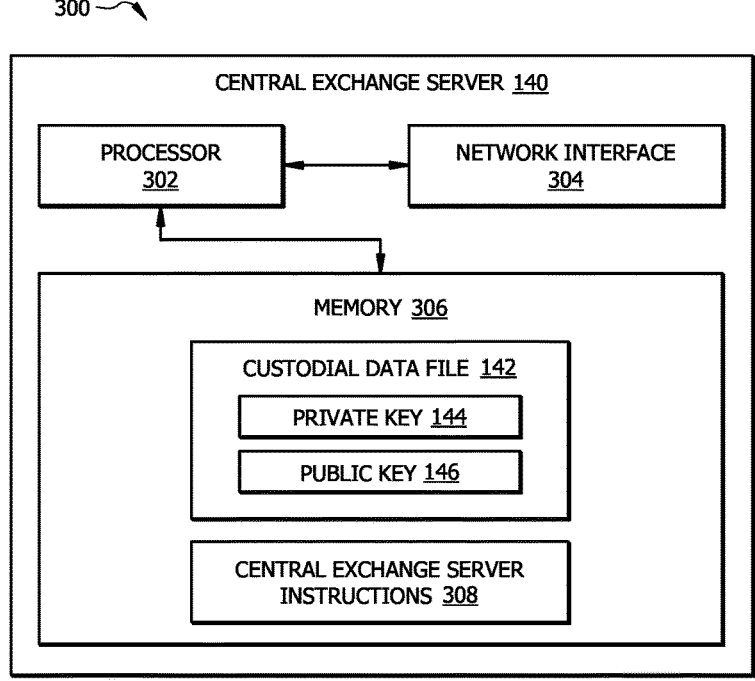
FIG. 3 illustrates an example schematic diagram of the central exchange server shown in FIG. 1, in accordance with one or more aspects of the present disclosure.

FIG. 3 illustrates an example schematic diagram 300 of the central exchange server 140 shown in FIG. 1, in accordance with one or more aspects of the present disclosure.

The central exchange server 140 comprises a processor 302, a memory 306, and a network interface 304. The central exchange server 140 may be configured as shown in FIG. 3 or in any other suitable configuration.

The processor 302 comprises one or more processors operably coupled to the memory 306. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 306. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., central exchange server instructions 308) to implement the central exchange server 140. In this way, processor 302 may be a special-purpose computer designed to implement the functions disclosed herein. In one or more embodiments, the central exchange server 140 is implemented using logic units, FPGAs, ASICs, DSPs, or any other suitable hardware. The central exchange server 140 is configured to operate as described with reference to FIG. 2. For example, the processor 302 may be configured to perform at least a portion of the method 200 as described in FIG. 2.

The memory 306 comprises one or more disks, tape drives, or solid-state drives, and may be used as an over-flow data storage device, to store programs when such programs are selected for execution, and to store instructions and data that are read during program execution. The memory 306 may be volatile or non-volatile and may comprise a read-only memory (ROM), random-access memory (RAM), ternary content-addressable memory (TCAM), dynamic random-access memory (DRAM), and static random-access memory (SRAM).

The memory 306 is operable to store the custodial data file 142 including the private key 144 and the public key 146, and the central exchange server instructions 308. The central exchange server instructions 308 may include any suitable set of instructions, logic, rules, or code operable to execute the central exchange server 140.

The network interface 304 is configured to enable wired and/or wireless communications. The network interface 304 is configured to communicate data between the central exchange server 140 and other devices, systems, or domains (e.g. first user device 150, second user device 170, blockchain network 120 etc.). For example, the network interface 304 may comprise a Wi-Fi interface, a LAN interface, a WAN interface, a modem, a switch, or a router. The processor 302 is configured to send and receive data using the network interface 304. The network interface 304 may be configured to use any suitable type of communication protocol as would be appreciated by one of ordinary skill in the art.

It may be noted that each of the first user device 150 and the second user device 170 may be implemented like the central exchange server 140 shown in FIG. 3. For example, each of the first user device 150 and the second user device 170 may have a respective processor and a memory that stores data and instructions to perform operations discussed above.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a plurality of computing nodes that form a blockchain network, wherein a first of the plurality of computing nodes comprises a first user device of a user and a second of the plurality of computing nodes comprises a centralized exchange server that stores a first data file of a first type for the user comprising a private key used to perform data interactions relating to data objects of the user stored in the blockchain network, wherein a data file of the first type stores at least one private key associated with the user at the centralized exchange server;

wherein the centralized exchange server comprises a processor that is configured to:
receive a first request from the first user device to switch the first data file from the first type to a second type, wherein a data file of the second type stores at least one private key associated with the user at a user device of the user;
in response to receiving the first request, export the private key to the first user device for storage in a second data file of the second type at the first user device;
after exporting the private key to the first user device, delete the private key from the first data file;
receive a second request from the first user device to switch the second data file of the second type back to the first data file of the first type;
in response to receiving the second request, import the private key from the first user device for storage in the first data file of the first type;
after importing the private key, send a command to the first user device to delete the private key from the second data file;
receive a request second request from the first user device to switch the first data file from the first type to the second type, wherein the first user device and a second user device are registered with the centralized exchange server as associated with the user;
in response to receiving the second request, export a first copy of the private key to the first user device and, in conjunction, export a second copy of the private key to the second user device; and
after exporting the first copy of the private key and the second copy of the private key, delete the private key from the first data file.

2. The system of claim 1, wherein the processor is further configured to:
receive a third request from a second user device of the blockchain network to switch the first data file from the first type to the second type;
in response to receiving the third request, export the private key to the second user device for storage in a third data file of the second type at the second user device; and
after exporting the private key to the second user device, delete the private key from the first data file.

3. The system of claim 1, wherein the processor is further configured to:
receive a configuration from the first user device, wherein the configuration identifies a plurality of user devices comprising the first user device; and
in response to receiving the first request, export the private key to each of the plurality of user devices for storage in a respective data file of the second type at the user device.

4. The system of claim 3, wherein the processor is further configured to:

after importing the private key, send a command to each of the plurality of user devices to delete the private key from the respective data file of the second type.

5. The system of claim 1, wherein:
a software application associated with the centralized exchange server is installed on the first user device;
a user interface of the software application provides a toggle switch that is displayed on a display of the first user device;
the first request is generated when the toggle switch is switched from a first position to a second position; and
the second request is generated with the toggle switch is switched from the second position to the first position.

6. The system of claim 1, wherein the processor is further configured to:
when the private key is stored in the first data file at the centralized exchange server, sign using the private key one or more data interactions in the blockchain network relating to the data objects of the user.

7. The system of claim 1, wherein:
when the private key is stored in the second data file at the first user device, the first user device signs using the private key one or more data interactions in the blockchain network relating to the data objects of the user.

8. The system of claim 1, wherein the first data file of the first type is a custodial data file, and the second data file of the second type is a non-custodial data file.

9. A method for performing data interactions, comprising:
receiving a first request from a first user device of a user to switch a first data file from a first type to a second type, wherein:
a data file of the first type stores at least one private key associated with the user at a centralized exchange server and a data file of the second type stores at least one private key associated with the user at a user device of the user; and
the centralized exchange server stores the first data file of the first type for the user comprising a private key used to perform data interactions relating to data objects of the user stored in a blockchain network;
in response to receiving the first request, exporting the private key to the first user device for storage in a second data file of the second type at the first user device;
after exporting the private key to the first user device, deleting the private key from the first data file;
receiving a second request from the first user device to switch the second data file of the second type back to the first data file of the first type;
in response to receiving the second request, importing the private key from the first user device for storage in the first data file of the first type;
after importing the private key, sending a command to the first user device to delete the private key from the second data file
receiving a request second request from the first user device to switch the first data file from the first type to the second type, wherein the first user device and a second user device are registered with the centralized exchange server as associated with the user;
in response to receiving the second request, export a first copy of the private key to the first user device and, in conjunction, exporting a second copy of the private key to the second user device; and
after exporting the first copy of the private key and the second copy of the private key, deleting the private key from the first data file.

10. The method of claim 9, further comprising:
receiving a third request from a second user device of the blockchain network to switch the first data file from the first type to the second type;
in response to receiving the third request, exporting the private key to the second user device for storage in a third data file of the second type at the second user device; and
after exporting the private key to the second user device, deleting the private key from the first data file.

11. The method of claim 9, further comprising:
receiving a configuration from the first user device, wherein the configuration identifies a plurality of user devices comprising the first user device; and
in response to receiving the first request, exporting the private key to each of the plurality of user devices for storage in a respective data file of the second type at the user device.

12. The method of claim 11, further comprising:
after importing the private key, sending a command to each of the plurality of user devices to delete the private key from the respective data file of the second type.

13. The method of claim 9, wherein:
a software application associated with the centralized exchange server is installed on the first user device;
a user interface of the software application provides a toggle switch that is displayed on a display of the first user device;
the first request is generated when the toggle switch is switched from a first position to a second position; and
the second request is generated with the toggle switch is switched from the second position to the first position.

14. The method of claim 9, wherein the first data file of the first type is a custodial data file, and the second data file of the second type is a non-custodial data file.

15. A non-transitory computer-readable medium for performing data interactions, wherein the computer-readable medium stores instructions which when executed by a processor causes the processor to:
receive a first request from a first user device of a user to switch a first data file from a first type to a second type, wherein:
a data file of the first type stores at least one private key associated with the user at a centralized exchange server and a data file of the second type stores at least one private key associated with the user at a user device of the user; and
the centralized exchange server stores the first data file of the first type for the user comprising a private key used to perform data interactions relating to data objects of the user stored in a blockchain network;
in response to receiving the first request, export the private key to the first user device for storage in a second data file of the second type at the first user device;
after exporting the private key to the first user device, delete the private key from the first data file;
receive a second request from the first user device to switch the second data file of the second type back to the first data file of the first type;
in response to receiving the second request, import the private key from the first user device for storage in the first data file of the first type;
after importing the private key, send a command to the first user device to delete the private key from the second data file receive a request second request from the first user device to switch the first data file from the first type to the second type, wherein the first user device and a second user device are registered with the centralized exchange server as associated with the user;

in response to receiving the second request, export a first copy of the private key to the first user device and, in conjunction, export a second copy of the private key to the second user device; and after exporting the first copy of the private key and the second copy of the private key, delete the private key from the first data file.

16. The non-transitory computer-readable medium of claim 15, wherein the instructions further cause the processor to:

receive a third request from a second user device of the blockchain network to switch the first data file from the first type to the second type;

in response to receiving the third request, export the private key to the second user device for storage in a third data file of the second type at the second user device; and after exporting the private key to the second user device, delete the private key from the first data file.

17. The non-transitory computer-readable medium of claim 15, wherein the instructions further cause the processor to:

receive a configuration from the first user device, wherein the configuration identifies a plurality of user devices comprising the first user device; and in response to receiving the first request, export the private key to each of the plurality of user devices for storage in a respective data file of the second type at the user device.

18. The non-transitory computer-readable medium of claim 17, wherein the instructions further cause the processor to:

after importing the private key, send a command to each of the plurality of user devices to delete the private key from the respective data file of the second type.

19. The non-transitory computer-readable medium of claim 15, wherein:

a software application associated with the centralized exchange server is installed on the first user device;

a user interface of the software application provides a toggle switch that is displayed on a display of the first user device;

the first request is generated when the toggle switch is switched from a first position to a second position; and the second request is generated with the toggle switch is switched from the second position to the first position.

20. The non-transitory computer-readable medium of claim 15, wherein the first data file of the first type is a custodial data file, and the second data file of the second type is a non-custodial data file.

* * * * *